United States Patent [19]

Stuckey-Kauffman et al.

[11] Patent Number: 4,740,802
[45] Date of Patent: Apr. 26, 1988

[54] INVISIBLE ELECTROSTATIC TRACKING INDICIA FOR COLOR PLOTTERS

[75] Inventors: Dennis D. Stuckey-Kauffman, Oakland; Jace M. Brehm, El Granada; Gary A. Hart, San Jose, all of Calif.

[73] Assignee: Benson, Inc., Mountain View, Calif.

[21] Appl. No.: 880,988

[22] Filed: Jul. 2, 1986

[51] Int. Cl.⁴ ............................................. G01D 15/00
[52] U.S. Cl. .......................................... 346/157; 355/4
[58] Field of Search ..................... 346/157, 153.1, 1.1; 250/557, 561, 571; 355/13, 4, 88, 89, 102; 358/264, 279; 101/DIG. 13; 73/518; 242/57; 276/45, 16, 20

[56] References Cited
U.S. PATENT DOCUMENTS 4,007,489  2/1977  Helmberger et al. ............... 346/157

Primary Examiner—Arthur G. Evans
Attorney, Agent, or Firm—Theodore S. Park; Robert C. Colwell; Robert Barr

[57] ABSTRACT

A method for determining the position of media in a system where images are applied to the media at subsequent stations includes the steps of placing on the media at a first position tracking information consisting of a pattern of electrostatic charge to provide information with regard to the alignment of the media at the first station, and at the second station detecting the pattern of electrostatic charge to determine the alignment of the media at the second station. Typically the media consists of electrostatic paper and the step of placing charge on the paper is achieved by positioning positively charged styli in close proximity to the surface of the paper.

18 Claims, 1 Drawing Sheet

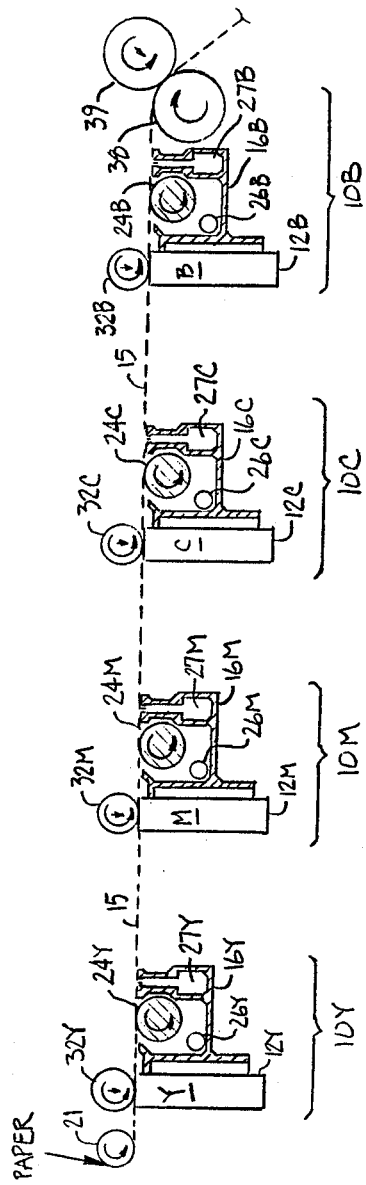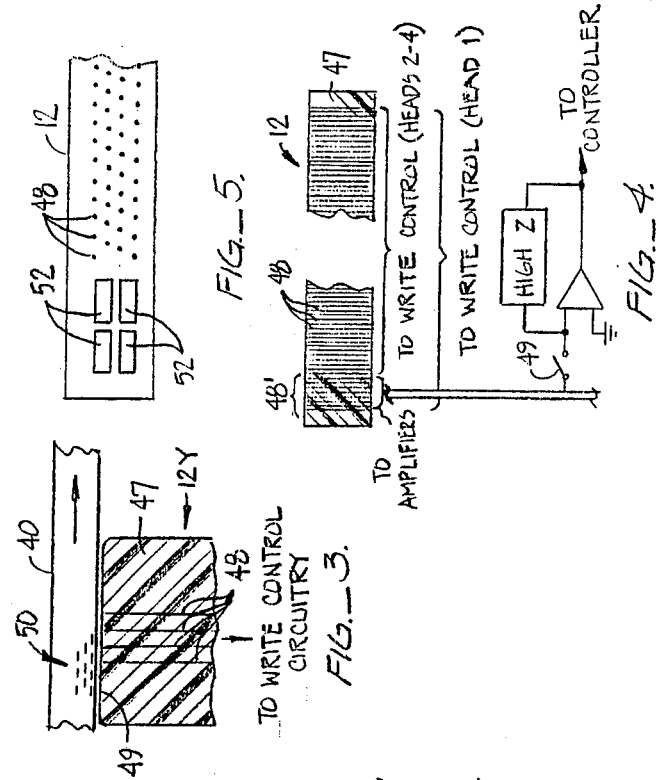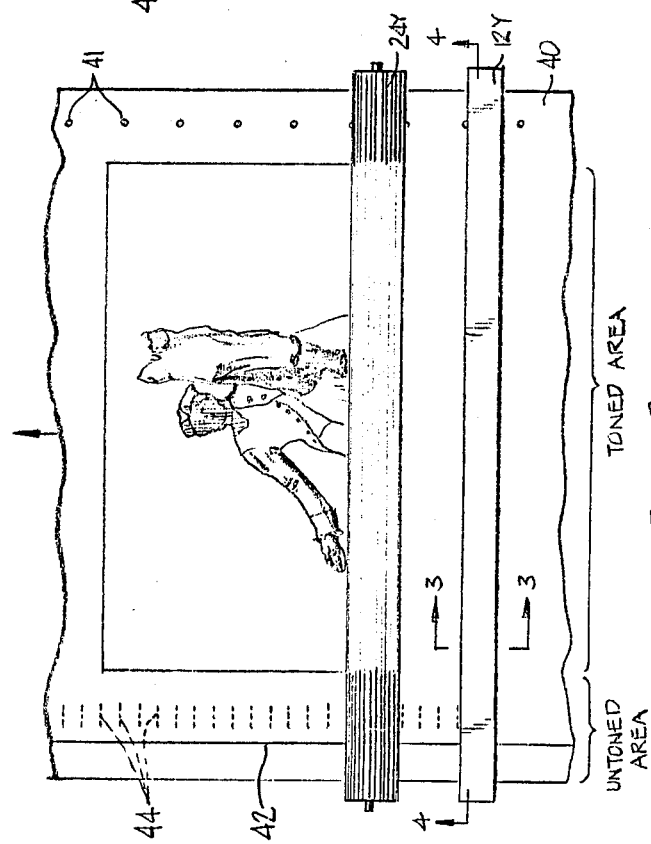

INVISIBLE ELECTROSTATIC TRACKING INDICIA FOR COLOR PLOTTERS

BACKGROUND OF THE INVENTION

1. Field of the Invention

This invention relates generally to electrostatic plotting, and particularly to electrostatic color plotting using multiple color print stations to produce a full-color image in a single pass, or a single writing head to produce a full-color image in multiple passes, and to a system for detecting and maintaining the alignment of the image at each station or on each pass in such plotters.

2. Description of the Prior Art

Electrostatic printing and plotting is accomplished by placing electrostatic charge in the form of the image to be printed on an electrographic media, usually paper. A liquid toner is then applied to the paper to produce a permanent visible image. In electrostatic color plotting or printing ("plotting" and "printing" are used interchangeably herein), separate color images are individually electrostatically printed on the paper and toner applied, with each image typically corresponding to one of three colors: cyan, yellow, and magenta. Although these three colors could be combined to produce black, because a better black may be achieved using a dedicated toner station, a fourth station employing black toner often is employed in such plotters. Consequently a full color image typically requires four single color images.

Commercially available electrostatic color plotters often employ a writing head consisting of an elongate arrangement of several thousand styli, at densities of about two hundred to the inch. Electrostatic printing paper is drawn across the styli while individual ones of the styli are selected and impressed with a voltage potential that, in conjunction with another electrode mounted proximate the paper, creates a "dot" of charge on the paper. The image for each color may be considered as consisting of lines or "rasters" of these dots which, when toned, form the image of that color. For full color, the cyan, yellow, magenta, and black images are separately printed, but each is registered to be superimposed upon the preceding image. Thus, depending upon the final color desired, any particular dot location on the image may have one or more colors printed there.

In multiple pass plotters of the prior art, the full color image is printed by passing the paper through a print station, which includes a single electrostatic writing head and several different color toner baths, one color of which is employed to print the first image. The paper is then rewound and drawn past the writing head again with a different colored toner bath moved into position for each subsequent image. This multiple pass technique suffers from a number of disadvantages, including the time required to complete the total image. With respect to our invention, however, the most significant disadvantage of such multiple pass technology is the extreme difficulty of maintaining the relative position of each successive image upon the paper relative to all preceding images. Furthermore, this problem is exacerbated by changes in the dimensions of the paper itself caused by humidity, nonuniformities, and forces applied during printing.

Many of the disadvantages of multiple pass plotters have been overcome by single pass multiple station color plotters. In such plotters, the media is drawn past a succession of writing heads, each with its own corresponding toner application and drying station. Although single pass technology alleviates many of the problems of multiple pass technology, techniques must still be employed to assure that the image placed on the media at each station is in proper registration with all preceding images.

One prior art solution for maintaining proper registration of images has been to print colored alignment marks on the media around the periphery of the images. These marks are detected at downstream stations in a single pass plotter, or prior to each pass in a multiple pass plotter. In either of such systems an optical detector, such as a charge coupled device, is positioned to detect the location of the alignment marks and supply appropriate signals to physically reposition the media with respect to the writing head(s). One such prior art technique is described in U.S. Pat. No. 4,485,982.

Unfortunately, such prior art systems suffer from several disadvantages. Special apparatus must be provided to apply the toner for the alignment marks at the first station, or during the first pass of the media. Because the colors employed during the first pass at the first station in such a plotter are not necessarily the most desirable colors for the printing of the alignment marks, a separate toning station often is required to print the marks. The extra station requires extra hardware and consumes additional space in a machine which is desired to be as small as possible. The extra printing station must also be supported by a supply of toner, a pump for delivering the toner to the station, and a system for removing excess toner from station as well as the media.

A further disadvantage of such systems is the need for special mark detection hardware at each subsequent station, or in multiple pass systems at the printing station. Such additional hardware typically includes optical sensors, support circuitry and software for each. Additionally, the optical sensors at each head must be aligned with respect to that head within approximately a thousandth of an inch for sufficiently accurate use of the sensed information. Furthermore, because the alignment marks are printed onto the same media as the image, for applications in which viewing the alignment marks is undesirable, the image must be trimmed or masked to hide the marks.

SUMMARY OF THE INVENTION

Accordingly, a need exists for a system for determining the alignment of media in such plotters during subsequent passes or at downstream stations, which system avoids the placing of visible marks on the media. We have developed a system which provides such advantages and which eliminates the need for special purpose hardware associated with detecting the marks and maintaining alignment of the media. In a preferred embodiment in a system where media is transported from a first position to a second position, our method of determining the alignment of the media at the second position without placing visible marks on the media includes the steps of placing on the media at the first position tracking indicia consisting of a pattern of electrostatic charge to provide information with regard to the alignment of the media at the first position, and at the second position, detecting the pattern of electrostatic charge to thereby determine the alignment of the media at the second position.

The system of our invention employs a region of the image writing head itself to place the electrostatic pattern on the media, as well as to detect the location of the pattern. This region is outside the border of the image. Low drain amplifiers connected to appropriate styli or other type electrodes of downstream writing heads then detect the charge through the writing head itself. In multiple pass plotters, the amplifiers are disabled during the first pass, then enabled during all subsequent passes. In this manner no additional image writing or image sensing apparatus are required to determine the alignment of the media during subsequent passes or at downstream stations. In a typical system the media will comprise paper having insulative and conductive layers, and the tracking indicia will consist of a first indicator of left/right position and a second indicator of timing (fore/aft) information. Typically the left/right information is provided by continuously driving one or a few styli to cause a line to be "written" onto the media extending in the direction of travel. The timing information may be provided by spaced apart marks orthogonal to the line.

BRIEF DESCRIPTION OF THE DRAWINGS

FIG. 1 is a cross-sectional view of a single pass, multiple station color plotter of a type suitable for utilizing the invention.

FIG. 2 is a bottom view of the media illustrating the first writing head and toner roller.

FIG. 3 is a cross-sectional view of a writing head and the media.

FIG. 4 is a front view of an electrostatic writing head.

FIG. 5 is a top view of an alternate embodiment of an electrostatic writing head.

DETAILED DESCRIPTION OF THE PREFERRED EMBODIMENTS

FIG. 1 is a schematic cross-sectional view of a single pass, multiple station color plotter. The plotter includes four toning stations, 10Y, 10M, 10C, and 10B, positioned along a media transport path designated by the dashed line 15. In the preferred embodiment, the media, typically electrostatic paper, travels from a paper supply roll (not shown) around the roller 21, then along transport path 15. At spaced locations along the transport path 15 the four toner stations are structured to print an image in the separate colors of yellow, magenta, cyan, and black.

Each toner station includes a writing head, 12Y, 12M, 12C, and 12B disposed substantially perpendicularly to the media transport path 15. The writing heads 12, as well as the remaining portions of the toner stations 10 are held in fixed alignment by side rails (not shown) on opposite sides of the machine. Each toner station 10 also includes an extrusion 16 to which the writing head 12 is affixed. Extrusion 16 provides rigidity for writing head 12, as well as support for toner roller 24 and toner fountain 26. Extrusion 16 also provides a chamber 27 which during operation is maintained at less than atmospheric pressure.

In operation, when the media traverses the toning station, the writing head 12 places a charge on the media. The write head 12 in each of the printing stations includes an elongate array of staggered rows of styli. Typically the styli comprise fine electrically conductive wire embedded in an epoxy or fiber glass resin. Such heads, as well as the electronics to drive them are described in U.S. Pat. No. 4,419,679. After writing, color toner sprayed from fountain 26 onto roller 24 is pressed against the media to adhere strongly to those regions of the media onto which charge has been written. Excess toner, for example, that applied by roller 24 between charged locations on the media, is then "vacuumed" from the media by low pressure chamber 27. (A more detailed description of the operation of the toner stations and the advantages of the particular structure depicted may be found in commonly assigned U.S. patent application Ser. No. 06/794,710 entitled "Plotter Toner Station" and filed Nov. 4, 1985.) After the complete image is formed by each of the four colors—yellow, magenta, cyan, and black—two rollers 38 and 39 move the media out of the machine to the user.

As evident from FIG. 1, to produce the highest quality images, the image applied to the media at each of the toning stations 10 must be precisely aligned with respect to all preceding images. In prior art systems this is achieved by placing registration marks on the media and then detecting the position of these registration marks using optical sensors positioned in advance of the downstream writing heads. Detection of such marks allows corrections to be made to assure registration of the images. Unfortunately such prior art approaches suffer from the disadvantages discussed above, for example, the need to provide an additional toning station to place the marks on the media, and the need for an optical sensor positioned in advance of each downstream station. This extra equipment unnecessarily adds to the cost of the plotter.

In accordance with our invention, invisible electrostatic tracking indicia are placed on the media by the first writing head 12Y. These charged regions are then detected by the writing heads, 12M, 12C and 12B, at each downstream station. The position of the image applied by the downstream stations is then adjusted as necessary.

FIG. 2 is a bottom view of the first write head 12Y together with the first toner roller 24Y in a preferred embodiment of our invention. The sheet of media, such as electrostatic paper 40, is also shown. Sheet 40 includes a series of sprocket holes 41 along one margin for engagement by drive roller 21. Of course, a pinch-feed system could also be employed eliminating the need for sprocket holes in the media 40.

Writing head 12Y, in a manner to be explained in further detail below, applies a charge to media 40 to provide tracking information. In a preferred embodiment, this charge consists of a line 42 in the direction of travel, together with a plurality of timing marks 44 perpendicular to the direction of travel. Although line 42 and timing marks 44 are shown on media 40 in FIG. 2, it should be understood that these marks are not visible, instead consisting only of accumulations of electrons in an insulating portion of the electrostatic paper. Toner roller 24Y is designed in such a manner as not to tone this margin of the media 40, as designated by the regions labeled "Untoned area" and "Toned area" in FIG. 2. Avoiding toning media 40 in the region designated "Untoned area" may be achieved using any desired technique. For example, the toner roller may be of a slightly smaller diameter over that portion of its length corresponding to the untoned area. Alternatively, a baffle may be placed in the toner roller extrusion 16 to prevent liquid toner from reaching the untoned area. The toning portion of roller 24Y is shown shaded in FIG. 2.

FIG. 3 is a cross-sectional view of writing head 12Y illustrating the styli 48 extending through the epoxy 47 to an upper surface 49 of head 12Y. Media, such as electrostatic paper 40, is shown as it traverses head 12Y. In the manner explained in the above '679 patent, a positive potential applied to selective ones of styli 48 causes negative charge 50 to accumulate in the media proximate to the styli 48. By applying potential to appropriate ones of styli 48 at appropriate intervals, desired patterns of charge 50 will be caused to accumulate in media 40. These desired patterns, in the case of the tracking indicia, consist of position information such as invisible marks 42 and 44. In the toned area of the writing head these charges are accumulated in the media 40 in a pattern corresponding to the ultimately desired image of the color being printed at that station.

FIG. 4 is a longitudinal cross-section of any one of writing heads 12 for one embodiment of our invention. As shown, the writing head includes a large number (thousands) of styli 48 extending from an upper surface to a lower connector (not shown). In the case of the first writing head, which in the example of FIG. 1 is the yellow writing head, all of the styli 48 are connected to circuitry for controlling the writing of information by the styli. This circuitry is also described in the '679 patent. In one embodiment, in the case of writing heads 12M, 12C, and 12B, however, some of the styli 48' are connected to the series of amplifiers such as also depicted in FIG. 4. In FIG. 4 the styli 48' connected to the amplifiers are shown along the left-hand edge of the writing head in the region corresponding to the untoned area of FIG. 2. The remaining styli 48, that is the ones not connected to amplifiers, are coupled to write control circuitry.

In operation, media 40 passes head 12Y before any other writing head. Head 12Y "writes" into the untoned area the desired registration and timing marks. Head 12Y "writes" in the remaining area of the media the image to be toned. At the next downstream station, which in the case of FIG. 1 is the magenta station, styli 48' corresponding to the width of the untoned area are coupled to amplifiers to detect the untoned charge which accumulated in media 40 as a result of the potential applied by writing head 12Y. By accurate detection of these untoned charged regions, and suitable control of toner stations 10M, 10C, and 10B, the image formed at each station may be placed with sufficient accuracy on the media to coincide with the images placed on the media at preceding stations. In such manner a full-color image may be produced. The use of the detected information to control writing of the image is described in commonly assigned U.S. patent applications Ser. No. 794,870, entitled "Registration System for an Electrostatic Printer/Plotter", and Ser. No. 722,497 entitled "Single-Pass Color Plotter."

In one embodiment, each of the leftmost desired number of styli in writing head 12M, 12C, and 12B are individually coupled to amplifiers. Because the amplifiers must sense a relatively small amount of charge, an extremely high input impedance and low bias current amplifier is desirable. It is also desirable for the amplifier to have a very low input capacitance. In the preferred embodiment, Texas Instruments' product TL081 or National Semiconductor LF355B is employed as the amplifier. A schematic of such an amplifier appears at the bottom of FIG. 4. A switch 49 allows disconnecting the amplifier(s) from the styli when the same styli must be used for both writing and "reading" charge, for example, in single station multiple pass embodiments. Of course, fewer amplifiers could be employed by multiplexing among the styli.

As the invisible electrostatic timing and position marks pass each downstream writing head, the styli coupled to the amplifiers detect the position and timing of the charge packets. This timing and position information is then supplied to the master controller, which makes appropriate adjustments to assure registration of the image. One such controller is described in copending U.S. patent application Ser. No. 794,934, entitled "Color Plotter Controller."

In a further embodiment of our invention, larger special purpose electrodes are employed to sense the electrostatic charge applied to the media at an upstream station or on a previous pass. FIG. 5 is a top view of one such embodiment. The writing styli 48 are shown for a four-row configuration, although fewer rows may be employed. At the end of writing head 12, four larger electrodes are shown. Electrodes 52 are aligned to detect the charged regions 50 (see FIG. 3) along the periphery of media 40 as those regions pass head 12. The use of larger electrodes 52 allows the electrodes to provide a larger output signal in proportion to the relative dimensions of the electrodes 52 and the styli 48. Additionally, fewer amplifier/signal processing apparatus is required. Because the principle of operation of the styli and the sensing electrodes is the same, the words styli and sensing electrodes are used interchangeably herein.

Although a preferred embodiment of the method and apparatus of our invention has been described above, it should be understood that this embodiment is for the purpose of illustration, and is not intended to limit the invention. The scope of our invention may be ascertained from the appended claims.

We claim:

1. In a system wherein media are transported from a first position to a second position, a method of determining alignment of the media at the second position without placing visible marks on the media comprising:
    placing on the media at the first position tracking indicia consisting of a pattern of electrostatic charge to provide information with regard to the alignment of the media at the first position; and
    at the second position, detecting the pattern of electrostatic charge to thereby determine the alignment of the media at the second position.

2. A method as in claim 1 wherein the step of placing further comprises:
    employing at the first position a writing head of the type having a plurality of styli extending to a surface;
    positioning the media in proximity to the surface of the writing head; and
    applying signals to selected styli to thereby cause electrostatic charge to accumulate in the media adjacent the surface.

3. A method as in claim 2 wherein the step of applying signals comprises connecting a source of electrical signals to the selected styli.

4. A method as in claim 2 wherein the pattern comprises:
    a first indication of a position of the media in a first direction; and
    a second indication of a location of the media in a second direction.

5. A method as in claim 3 wherein the second direction is orthogonal to the first direction.

6. A method as in claim 1 wherein the step of detecting the pattern comprises:
employing at the second position a writing head of the type having a plurality of styli extending to a surface;
positioning the media in proximity to the surface of the writing head; and
monitoring selected styli of the plurality to detect the pattern of electrostatic charge.

7. A method as in claim 6 wherein the step of monitoring comprises connecting an amplifier to at least one of the selected styli.

8. A method as in claim 1 further comprising the step of:
at positions subsequent to the second position, detecting the pattern of electrostatic charge to thereby determine the alignment of the media at such positions subsequent to the second position.

9. Apparatus for controlling registration of images having boundaries which images are printed onto media at different stations, the apparatus comprising:
a first station including a first writing head having a first plurality of styli for placing a pattern of electrostatic charge on the media outside the boundaries of the image; and
a second station including a second writing head having a second plurality of styli selectably connectable to amplifying means each of the second plurality being positioned to detect the pattern of electrostatic charge.

10. Apparatus as in claim 9 wherein the first writing head further comprises a third plurality of styli for writing a first image to be toned inside the boundaries.

11. Apparatus as in claim 10 wherein the second writing head further comprises a fourth plurality of styli for writing a second image to be toned inside the boundaries.

12. Apparatus as in claim 11 wherein each of the first and second writing heads comprise:
an elongate body of insulating material disposed to extend transversely across the media, the body having styli extending from interior the insulating material to an upper surface disposed to contact the media.

13. Apparatus as in claim 12 wherein:
the media is oriented to pass each of the first and second stations in a selected plane; and
the styli comprise wires having a minimum cross section in the selected plane.

14. Apparatus as in claim 12 wherein the second plurality of styli comprise electrodes having an enlarged surface for detecting the pattern of electrostatic charge.

15. Apparatus as in claim 9 wherein each of the writing heads of the first and second stations also have additional styli for placing electrostatic charge on the media inside the boundaries of the image.

16. In an electrostatic plotter of the type having a single writing head having a plurality of styli extending to a surface and multiple toner stations wherein a first color image is printed on media on a first pass over the writing head and the media rewound and repassed over the writing head for successive colors, a method of aligning subsequent images with the first image without placing visible marks on the media comprising:
on a first pass applying a potential to first selected ones of the plurality of styli outside the first image to cause an invisible pattern of electrostatic charge to be placed on the media; and
on a subsequent pass, employing second selected ones of the plurality of styli to detect the invisible pattern of electrostatic charge.

17. A method as in claim 16 wherein the step of applying further comprises:
positioning the media in proximity to the surface of the writing head; and
applying signals to selected styli to thereby cause electrostatic charge to accumulate in the media adjacent the surface.

18. In an electrostatic plotter of the type having a single writing head having a plurality of styli extending to a surface and multiple toner stations wherein a first color image is printed on media on a first pass over the writing head and the media rewound and repassed over the writing head for successive colors, a method of aligning subsequent images with the first image comprising:
on a first pass applying a potential to first selected ones of the plurality of styli outside the first image to cause a pattern of electrostatic charge to be placed on the media; and
on a subsequent pass, employing second selected ones of the plurality of styli to detect the pattern;
wherein the applying step comprises the steps of:
positioning the media in proximity to the surface of the writing head; and
applying signals to selected styli to thereby cause electrostatic charge to accumulate in the media adjacent the surface;
and wherein the employing step comprises the steps of:
positioning the media in proximity to the surface of the writing head; and
monitoring selected styli of the plurality to detect the pattern of electrostatic charge.

* * * * *